(12) United States Patent
Tawada

(10) Patent No.: US 8,345,290 B2
(45) Date of Patent: Jan. 1, 2013

(54) APPARATUS FOR DETERMINING FACSIMILE TRANSMISSION AUTHORIZER AND FACSIMILE MACHINE HAVING THE APPARATUS

(75) Inventor: Masaki Tawada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 552 days.

(21) Appl. No.: 12/589,387

(22) Filed: Oct. 22, 2009

(65) Prior Publication Data

US 2010/0115589 A1   May 6, 2010

(30) Foreign Application Priority Data

Oct. 30, 2008   (JP) .................................. 2008-279081

(51) Int. Cl.
*G06F 15/00* (2006.01)
*G06F 15/16* (2006.01)

(52) U.S. Cl. .......................................... 358/1.15; 726/4

(58) Field of Classification Search .................. 358/1.15
See application file for complete search history.

(56) References Cited

U.S. PATENT DOCUMENTS

| | | | |
|---|---|---|---|
| 2006/0017982 A1* | 1/2006 | Gaebel et al. | 358/400 |
| 2007/0071199 A1 | 3/2007 | Ozeki | |
| 2010/0082971 A1* | 4/2010 | Selvaraj | 713/153 |
| 2010/0290087 A1* | 11/2010 | Van Hoof et al. | 358/1.15 |

FOREIGN PATENT DOCUMENTS

| | | |
|---|---|---|
| JP | 2-200058 | 8/1990 |
| JP | 2002-108789 A | 4/2002 |
| JP | 2005-011176 A | 1/2005 |
| JP | 2007-074389 | 3/2007 |
| JP | 2007-096385 | 4/2007 |
| JP | 2007-228239 | 9/2007 |
| JP | 2008-046793 | 2/2008 |
| JP | 2009-244966 A | 10/2009 |

* cited by examiner

*Primary Examiner* — Saeid Ebrahimi Dehkordy
(74) *Attorney, Agent, or Firm* — Edwards Wildman Palmer LLP; David G. Conlin; David A. Tucker

(57) ABSTRACT

In a facsimile machine having the function of authorization by the authorizer, an authorizer determining apparatus that can alleviate workload on the authorizers is provided, and a facsimile machine having such an authorizer determining apparatus is also provided. The authorizer determining apparatus for the facsimile machine includes a candidate selecting unit selecting, based on a sum of condition values of a plurality of attributes (such as sender, destination, and format of document to be transmitted) selected in advance for a facsimile transmission, a set of authorizer candidates consisting of possible authorizers having condition values not smaller than the sum, and an authorizer determining unit for determining an authorizer candidate having the lowest condition value among the set of authorizer candidates.

15 Claims, 8 Drawing Sheets

| USER NAME | CONDITION POINT | REQUIRED AUTHORIZER |
|---|---|---|
| aoki | 40 | --- |
| aoyama | 60 | --- |
| deguchi | 80 | --- |
| endou | 40 | --- |
| hirai | 80 | --- |
| hirata | 60 | --- |
| kasai | 60 | --- |
| katou | 40 | --- |
| matsuda | 80 | --- |
| ... | ... | ... |

FIG. 5

| DESTINATION NUMBER | CONDITION POINT | REQUIRED AUTHORIZER |
|---|---|---|
| 03-3012-3001 | 10 | --- |
| 03-3123-4567 | 20 | --- |
| 03-5012-7890 | 40 | AUTHORIZER B |
| 06-6012-4680 | 60 | AUTHORIZER A |
| 03-3012-3002 | 10 | --- |
| 03-3012-3005 | 10 | --- |
| 03-5123-9870 | 40 | --- |
| 06-6117-1190 | 60 | AUTHORIZER B |
| ... | ... | ... |
| NUMBER UNREGISTERED | 100 | --- |

FIG. 6

| FORMAT STYLE | CONDITION POINT | REQUIRED AUTHORIZER | FORMAT CHARACTERISTIC INFO |
|---|---|---|---|
| A | 20 | --- | CIRCULAR |
| B | 30 | --- | PRIVATE |
| C | 40 | --- | ESTIMATE |
| D | 50 | --- | INVOICE |
| ... | ... | ... | ... |
| FORMAT NOT FOUND | 100 | --- | --- |

FIG. 7

| AUTHORIZER NAME | CONDITION POINT | MAIL ADDRESS |
|---|---|---|
| AUTHORIZER A | 240 | syoninA@xxxx.co.jp |
| AUTHORIZER B | 200 | syoninB@xxxx.co.jp |
| AUTHORIZER C | 120 | syoninC@xxxx.co.jp |
| AUTHORIZER D | 70 | syoninD@xxxx.co.jp |
| ... | ... | ... |

FIG. 8

| SERIAL NUMBER | DATE & TIME OF RECEPTION | DESTINATION NUMBER | USER NAME | FORMAT STYLE | SUM OF CONDITION POINTS | 1ST AUTHORIZER | 1ST AUTHORIZATION STATE | 2ND AUTHORIZER | 2ND AUTHORIZATION STATE | ... | TRANSMISSION RESULT |
|---|---|---|---|---|---|---|---|---|---|---|---|
| 080923001 | 09/23 10:00 | 03-3012-3001 | aoki | A | 70 | AUTHORIZER D | TRANSMISSION COMPLETE | — | — | | TRANSMISSION COMPLETE |
| 080923002 | 09/23 10:20 | 03-5123-9870 | hirai | B | 150 | AUTHORIZER B | AUTHORIZATION PENDING | — | — | | AUTHORIZATION PENDING |
| 080923003 | 09/23 12:00 | 052-123-7890 | deguchi | D | 230 | AUTHORIZER A | REFUSED | — | — | | TRANSMISSION CANCELLED |
| 080923004 | 09/23 12:05 | 03-3123-4567 | hirata | A | 100 | AUTHORIZER C | TRANSMISSION COMPLETE | — | — | | TRANSMISSION COMPLETE |
| 080923005 | 09/23 12:10 | 06-6117-1190 | aoki | A | 120 | AUTHORIZER C | AUTHORIZED | AUTHORIZER B | AUTHORIZATION PENDING | | AUTHORIZATION PENDING |
| ... | | | | | | | | | | | |

130

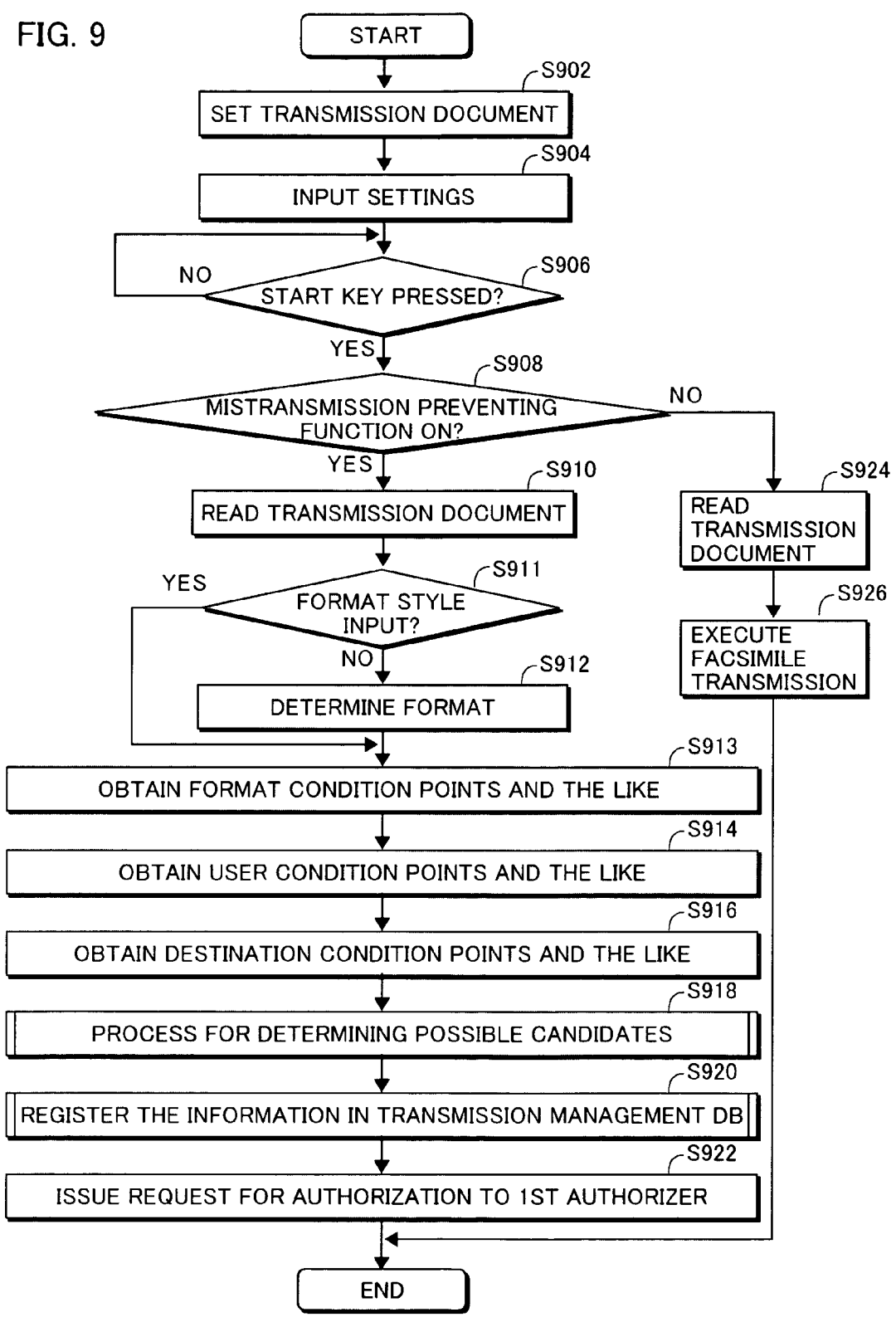

APPARATUS FOR DETERMINING FACSIMILE TRANSMISSION AUTHORIZER AND FACSIMILE MACHINE HAVING THE APPARATUS

CROSS-REFERENCE TO RELATED APPLICATION

This nonprovisional application claims priority under 35 U.S.C. §119(a) on Patent Application No. 2008-279081 filed in Japan on Oct. 30, 2008, the entire contents of which are hereby incorporated by reference.

BACKGROUND OF THE INVENTION

1. Field of the Invention

The present invention relates to a facsimile machine for transmitting image data and, more specifically, to a facsimile machine provided with a transmission authorizing function for preventing mistransmission of data, as well as to an authorizer determining apparatus for that purpose.

2. Description of the Background Art

Facsimile transmission utilizes public telephone network. Therefore, if an operator should input an erroneous transmission destination, an unintended mistransmission possibly occurs. Transmission of a facsimile to an erroneous destination possibly leads to leakage of important information. Therefore, one must pay close attention to the destination of facsimile transmission.

In order to prevent mistransmission, a technique has been known in which data can be transmitted after authorized by a third party (authorizer) different from the operator. Since the authorizer confirms the data transmission destination, the destination can be double-checked by the operator and the authorizer and, hence, possibility of mistransmission can be reduced.

Japanese Patent Laying-Open No. 2007-74389 (hereinafter referred to as "'389 application") discloses a technique in which an authorizer is determined in association with the operator, and after receiving a transmission permission from the authorizer, data is transmitted from a facsimile machine.

Japanese Patent Laying-Open No. 2007-228239 (hereinafter referred to as "'239 application") discloses a technique in which in a multi-functional peripheral performing transmission of image data and electronic mails, when an operator instructs data transmission, only an operation authorized by an administrator is executed and, if not authorized, the instruction is not executed and the data to be transmitted is deleted.

In such a facsimile system, the authorizer determines whether a facsimile transmission should be permitted or refused, considering the destination and contents of facsimile transmission. If the authorizer is set in association with the operator as in the technique described in '389 application, the task of authorization is required for every facsimile transmission. Such tasks of authorization tend to be assigned concentrated on a person of high position. As a result, workload of the authorizer increases, adversely affecting tasks other than the authorization task. Further, among destinations and contents of transmission, some may be out of the privilege of the authorizer and, therefore, sometimes it may be impossible for the authorizer to make a decision whether to authorize or not.

Such a problem cannot be solved solely by the technique disclosed in '389 application. In the technique disclosed in '239 application, the authorizer is fixed. Therefore, the problem that the workload of authorizer increases cannot be solved by the technique disclosed in '239 application.

SUMMARY OF THE INVENTION

According to a first aspect, the present invention provides an authorizer determining apparatus for determining an authorizer for facsimile transmission, including: a candidate selecting device for selecting a set of authorizer candidates, based on a combination of a plurality of attribute values selected in advance for the facsimile transmission; and a determining device for determining an authorizer candidate satisfying prescribed conditions, from the set of authorizer candidates.

The candidate selecting device selects a set of authorizer candidates, based on a combination of values of a plurality of attributes selected in advance for the facsimile transmission. The determining device determines an authorizer candidate who satisfies prescribed conditions to be the authorizer, from the set of authorizer candidates.

In determining an authorizer for a facsimile transmission, a set of authorizer candidates is selected based on a combination of values of a plurality of attributes, and the authorizer is determined from the set, in accordance with prescribed conditions. Therefore, the task of authorization is not fixedly assigned to a small number of persons. Using the authorizer determining apparatus, it is possible to share the work by a plurality of authorizers, as the authorizers are not limited to a small number of persons. As a result, an authorizer determining apparatus that can alleviate workload on the authorizer can be provided for a facsimile machine having the function of authorization by the authorizer.

Preferably, each of the attributes may assume one or a plurality of values; and the candidate selecting device includes a first condition value storage storing, for each possible value of each of the plurality of attributes, a condition value set in advance, a second condition value storage storing, for each of a plurality of possible authorizers, a condition value that is determined in accordance with privilege of the corresponding possible authorizer, a function value calculating device responsive to a request for facsimile transmission, for reading the condition value related to each value of the plurality of attributes of the facsimile transmission related to the request from the first condition value storage, and calculating a prescribed function value corresponding to the condition values, and a candidate extracting device for searching, in the second condition value storage, for a possible authorizer having a condition value not smaller than the value calculated by the function value calculating device, and extracting the possible authorizer to be the authorizer candidate.

The first condition value storage stores, for each possible value of each attribute, a preset condition value. The second condition value storage stores, for each of the plurality of authorizers, a condition value which is determined in accordance with the privilege of the authorizer. The function value calculating device reads, in response to reception of a facsimile transmission request, a condition value corresponding to each of the plurality of attribute values of the facsimile transmission as requested, and calculates a prescribed function value corresponding to the condition values. The candidate extracting device searches for a possible authorizer having a condition value not smaller than the value calculated by the function value calculating device in the second condition value storage, and extracts him/her as an authorizer candidate.

The authorizer candidate may differ depending on the combination of a plurality of attribute values of the facsimile machine. Therefore, the authorizers are not fixed to a few limited persons. Further, since persons having condition values not smaller than the function value obtained from the condition values are extracted as authorizer candidates, a well-qualified person with proper privilege can be selected as an authorizer. As a result, an authorizer determining apparatus, in which an appropriate authorizer is determined in consideration of authorizer privilege and information related to the facsimile machine and which thereby alleviates workload on the authorizer, can be provided for a facsimile machine having the function of authorization by the authorizer.

Preferably, the prescribed function value is a sum of condition values read from the first condition value storage corresponding to each value of the plurality of attributes.

Condition values obtained corresponding to the attribute values of facsimile transmission request are simply summed, and a possible authorizer having a condition value not smaller than the sum is extracted as an authorizer candidate. Since condition values are summed with equal weight on each condition value, an appropriate authorizer candidate can be extracted in consideration of all values of the plurality of attributes.

Preferably, the determining device includes a device for determining an authorizer candidate having the lowest condition value in the set of authorizer candidates to be the authorizer in regard to the request.

Among the extracted authorizer candidates, one having the lowest condition value is determined to be the authorizer. Typically, the number of possible authorizers having high condition values is small, while the number of those having low condition values is large. By assigning the authorization task to the one having the lowest condition value among the possible authorizers having condition values sufficient to be qualified as authorizer candidates, it becomes possible to distribute the task of authorization to a larger number of authorizers, and concentration of the authorization tasks to one having high condition value can be avoided.

Preferably, the first condition value storage is capable of storing a required authorizer, for every possible value of a first attribute among the plurality of attributes. The authorizer determining apparatus further includes a device responsive to storage of a required authorizer stored in the first condition value storage in association with the first attribute value related to the facsimile transmission as requested, for determining the authorizer to be the authorizer for the facsimile transmission as requested, in addition to the authorizer determined by the determining device.

The first condition value storage is capable of storing the required authorizer for each possible value of a certain attribute (first attribute), among the plurality of attributes selected beforehand for the facsimile transmission. When a required authorizer is stored for the value of first attribute in connection with a facsimile transmission request, the stored authorizer is added as the authorizer for the facsimile transmission. As a result, if the required authorizer is stored in the first condition value storage for the facsimile transmission of which first attribute has a specific value, authorization is made without fail by the stored authorizer. Since a specific authorizer authorizes without fail under specific conditions, more reliable authorization becomes possible. As a result, an authorizer determining apparatus that can distribute workload on the authorizers to as many authorizers as possible while maintaining relevance of authorization can be provided for a facsimile machine having the function of authorization by the authorizer.

Preferably, the plurality of attributes is information for identifying a person who requested the facsimile transmission, information for identifying destination of the facsimile transmission or format information of a document to be transmitted by facsimile, or an arbitrary combination of these.

Who requested the facsimile transmission, facsimile transmission destination, and format information of the document to be facsimile-transmitted have significant influence on the importance of facsimile transmission. By allocating a condition value beforehand to each of these attribute values and by determining the authorizer based thereon, it becomes possible to determine the authorizer reflecting the importance of contents of the facsimile transmission.

According to a second aspect, the present invention provides a facsimile machine, including: any of the above-described authorizer determining apparatus for determining, upon reception of a facsimile transmission request, an authorizer for the facsimile transmission; an authorization requesting device for issuing a request for authorizing the facsimile transmission to the authorizer determined by the authorizer determining apparatus; and a facsimile transmission executing device for executing the facsimile transmission authorized by the authorizer in accordance with attributes of the facsimile transmission, among facsimile transmissions for which authorization has been requested by the authorization requesting device.

In the facsimile machine, in determining an authorizer for a facsimile transmission, a set of authorizer candidates is selected based on a combination of a plurality of attribute values, and an authorizer is determined in accordance with prescribed conditions. By using the authorizer determining apparatus, it becomes possible to distribute the task of authorization to a plurality of authorizers, not limited to a fixed few. As a result, a facsimile machine having the function of authorization by the authorizer that can alleviate workload on the authorizers can be provided.

As described above, by the authorizer determining apparatus, for each facsimile machine, an authorizer is determined in accordance with a combination of a pre-selected plurality of attributes and prescribed conditions. The authorizers are determined such that the task of authorization can be distributed to as many authorizers as possible, among the qualified possible authorizers having necessary privileges. Therefore, the task of authorization is not fixedly assigned to a limited few authorizers, and the task can be shared by a number of authorizers. As a result, in a facsimile machine having the function of authorization by the authorizer, an authorizer determining apparatus that can alleviate workload on the authorizers can be provided, and a facsimile machine having the authorizer determining apparatus can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a configuration of a transmission destination information management table 100.

FIG. 6 shows a configuration of format information management table 110.

FIG. 7 shows a configuration of an authorizer information management table 120.

FIG. 8 shows a configuration of a transmission management database 130 stored in a transmission information management unit 52 of digital multi-functional peripheral 30.

FIG. 9 shows, in the form of a flowchart, a control structure of an authorizer determining program for determining an authorizer in accordance with an input transmission setting and issuing a request for authorization to a first authorizer.

DESCRIPTION OF THE PREFERRED EMBODIMENTS

Figure 1:
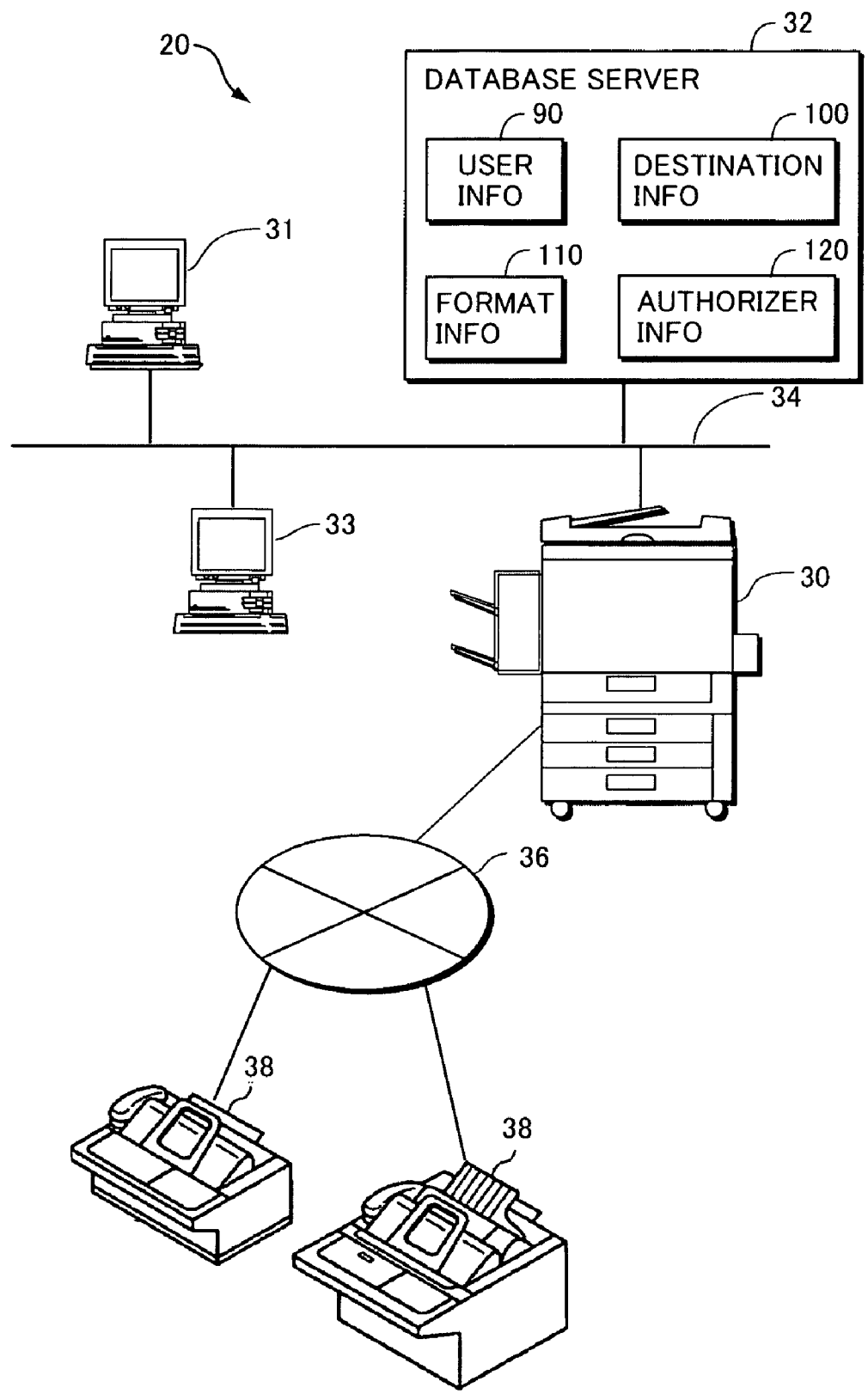
FIG. 1 is a schematic diagram showing an overall configuration of a data communication system 20 including a digital multi-functional peripheral 30 with the facsimile transmission function in accordance with an embodiment.

In the following description and the drawings, the same components are denoted by the same reference characters and same names. Their functions are also the same. Therefore, detailed description thereof will not be repeated.

—Configuration—

FIG. 1 is a schematic diagram showing an overall configuration of a data communication system 20 including a digital multi-functional peripheral 30 with the facsimile transmission authorizing function in accordance with an embodiment. Referring to FIG. 1, digital multi-functional peripheral 30 is connected to an LAN (Local Area Network) 34 and a telephone network 36. Data communication system 20 further includes a plurality of computers 31, a database server 32 and a mail server 33, connected to LAN 34. Each of the plurality of computers 31 can be used for authorizing facsimile transmission. To telephone network 36, an unidentified number of facsimile machines 38 as transmission destinations are further connected.

Mail server 33 manages mails corresponding to accounts registered as users of LAN 34. In the present system, an electronic mail is used to notify authorization request from a facsimile machine to an authorizer, and to notify a result of processing from a facsimile machine to a person who requested the facsimile transmission.

A Web server, which will be described later, is running inside digital multi-functional peripheral 30. In response to a request from the outside, the Web server returns a requested HTML (Hyper Text Mark-up Language) document to the outside. If there is a description of an image transmission in the HTML document, it transmits the corresponding image together with the HTML document.

Each computer 31 is provided with a Web browser. From digital multi-functional peripheral 30 to the mail account of an authorizer, an electronic mail including access information to a facsimile transmission image as an object of authorization is transmitted. When the authorizer reads the electronic mail from his/her mail account and clicks a portion of access information, the Web browser is activated, a request for the HTML document including the facsimile transmission image as the object of authorization is transmitted to the Web server in digital multi-functional peripheral 30, and the HTML document is returned from the Web server. Viewing the HTML document, the authorizer can confirm the contents of facsimile image.

Details of database server 32 will be described later. In summary, database server 32 stores a user information management table 90 for managing information of users of facsimile transmission, a transmission destination information management table 100 for managing information related to facsimile transmission destinations, a format information management table 110 storing format information for determining whether or not a facsimile-transmitted document is of a predefined format, and an authorizer information management table 120 for managing information related to authorizers, and performs a task of returning information corresponding to any inquiry.

Figure 2:
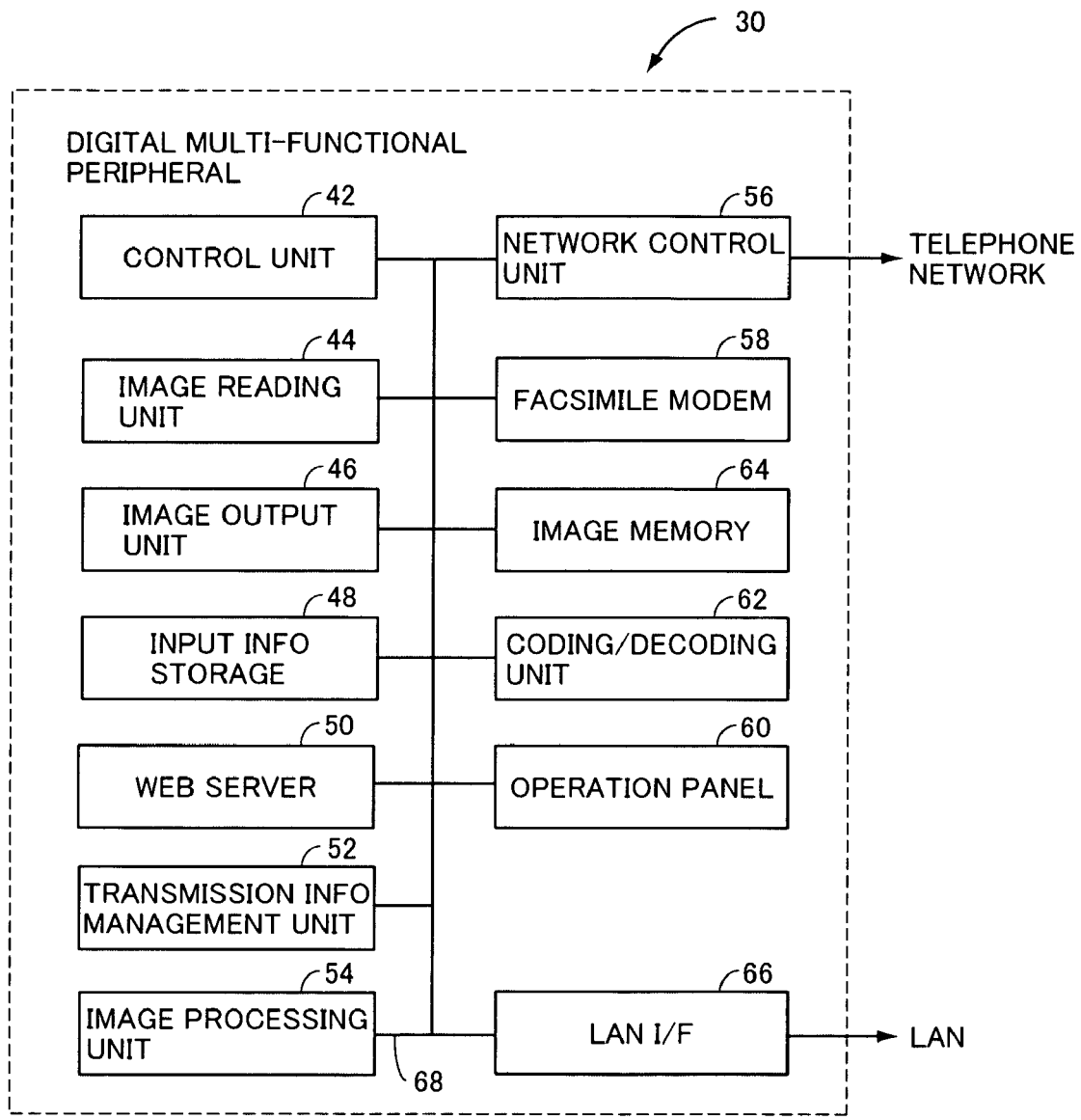
FIG. 2 is a block diagram showing a configuration of digital multi-functional peripheral 30 in accordance with an embodiment of the present invention.

FIG. 2 is a block diagram showing a configuration of digital multi-functional peripheral 30. Referring to FIG. 2, digital multi-functional peripheral 30 includes a control unit 42 including a CPU (Central Processing Unit), for overall control of the facsimile machine, a bus 68 connected to control unit 42, an image reading unit 44 for reading a document image, an image output unit 46 for outputting image data to a sheet of recording paper, an image processing unit 54 for forming image data for facsimile transmission from the image read by image reading unit 44, an operation panel 60 receiving an instruction input by an operator and applying it to control unit 42, an LAN interface 66 for connection to the LAN, a network control unit connected to the telephone network for controlling the network, a facsimile modem 58 connected to the telephone network for performing facsimile transmission, a coding/decoding unit 62 coding image data read by image reading unit 44 and decoding coded data received by facsimile modem 58 to original image data, and an image memory 64 for storing image data in the coded state, all connected to bus 68.

Digital multi-functional peripheral 30 further includes an input information storage unit 48 receiving an input from operation panel 60 for a setting related to facsimile transmission and storing the input setting information, a Web server 50, and a transmission information management unit 52 storing information for managing the process for authorizing facsimile transmission in digital multi-functional peripheral 30.

Image reading unit 44, image output unit 46, image processing unit 54, operation panel 60, coding/decoding unit 62, image memory 64, LAN interface 66, network control unit 56, facsimile modem 58, input information storage unit 48, Web server 50, and transmission information management unit 52 are connected through bus 68, and the overall control is performed by control unit 42. Particularly, control unit 42 performs authorization management for facsimile transmission as will be described later. The control structure of a program necessary for this purpose will be described later.

Figures 3, 4:
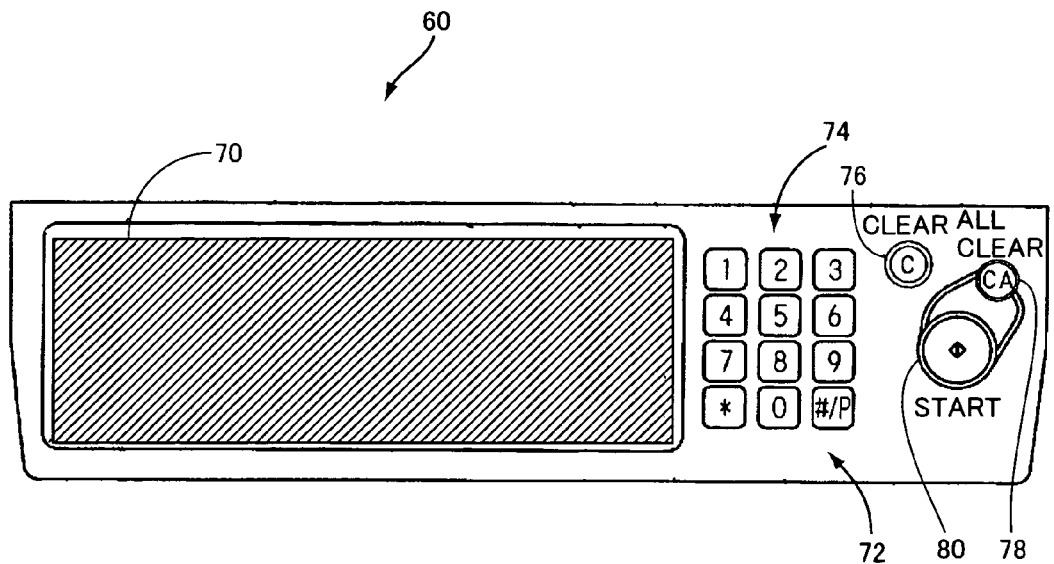
FIG. 3 shows an appearance of an operation panel 60 of digital multi-functional peripheral 30.
FIG. 4 shows a configuration of a user information management table 90.

FIG. 3 shows an appearance of operation panel 60. Referring to FIG. 3, operation panel 60 includes an operation unit 72 including various hardware keys, and a display unit 70 formed of a liquid crystal display and a touch panel, provided adjacent to operation unit 72.

Operation unit 72 includes ten keys 74 for inputting numerical values, a clear key 76 for clearing an input setting value, an all clear key 78 for fully clearing various input settings, and a start key 80.

Display unit 70 has a function of displaying information and of receiving an operation instruction through a soft key, using the liquid crystal display and the touch panel.

FIG. 4 shows a configuration of user information management table 90 storing information related to users of facsimile transmission, stored in database server 32. Referring to FIG. 4, user information management table 90 stores, for each user, a user name, a condition point used for calculation in determining an authorizer for a facsimile transmission by the user, and a required authorizer (if any) whose authorization is necessary when the user performs a facsimile transmission.

In user information management table 90, user names of all users who use the facsimile function in the network are registered. Condition point of each user is set in advance by a system administrator. The value of condition point is, in the present embodiment, set to be higher in accordance with the importance of task assigned to each user. Registration of a required authorizer is optional. In user information management table 90, a blank cell in the column of required authorizer means that a required authorizer is not registered. The same applies to transmission information management table 100 and format information management table 110.

FIG. 5 shows a configuration of transmission destination management table 100 stored in database server 32. Referring to FIG. 5, transmission destination information management table 100 stores, for each destination, a destination number, a condition point, and a required authorizer. In this table, the condition point is set to be higher in accordance with the importance of destination. The required authorizer means an authorizer whose authorization is necessary when facsimile is to be transmitted to a specific destination. Registration of a required authorizer is optional. In the example shown in FIG. 5, for the destination number "06-6012-4680," condition point of 60 and authorizer A as required authorizer are registered.

If the destination number of facsimile transmission is not registered in transmission destination information management table 100, record information of "number unregistered" is applied. If the number is unregistered, condition point higher than others is set.

FIG. 6 shows a configuration of format information management table 110 stored in database server 32. Referring to FIG. 6, format information management table 110 stores, for each format style, a condition point, a required authorizer, and image characteristic information of the format style. In this table, the condition point is set to be higher in accordance with the importance of format style used. The required authorizer means an authorizer whose authorization is necessary when a document of a certain format is to be sent by facsimile. Registration of a required authorizer is optional. The image characteristic information of format style represents characteristic information for image comparison, used to determine which format style corresponds to the image to be transmitted by facsimile.

If a corresponding format style is not registered in format information management table 110, record information of "format not found" is applied. If the corresponding format is not found, the condition point higher than others is set.

FIG. 7 shows a configuration of authorizer information management table 120 stored in database server 32. Referring to FIG. 7, authorizer information management table 120 stores, for each authorizer, an authorizer name, a condition point, and a mail address for contacting the authorizer. In this table, the condition point is set to be higher in proportion to the privilege of the authorizer.

In the present embodiment, referring to FIGS. 4 to 7, the sum of maximum values of condition points in user information management table 90, transmission destination information management table 100 and format information management table 110 is set not to exceed the maximum value of condition points in the authorizer information management table.

FIG. 8 shows a configuration of transmission management database 130 for managing the process for authorizing facsimile transmission, stored in transmission information management unit 52 in digital multi-functional peripheral 30. Referring to FIG. 8, transmission management database 130 stores, for each instruction of facsimile transmission, a serial number issued upon reception of the instruction, date and time of reception of the instruction, a destination number, a user name who instructed the transmission, a format style of the document to be transmitted, and a sum of condition points. Details related to the sum of condition points will be described later.

Transmission management database 130 further records, for each instruction of facsimile transmission, the name of a first authorizer determined by using the sum of condition points and a state of authorization by the first authorizer and, if any, the name of second and later authorizers as well as state of authorization by these authorizers, and the result of facsimile transmission. As will be described later, in the present embodiment, the second and later authorizers are required authorizers.

In control unit 42, two types of programs can be executed, that is, an authorizer determining program of determining an authorizer in accordance with input transmission settings and issuing an electronic mail to the first authorizer requesting authorization, and a facsimile transmission program of processing a reply from the authorizer, executing or refusing facsimile transmission as needed, or issuing an electronic mail to an additional authorizer, further requesting authorization.

FIG. 9 shows, in the form of a flowchart, a control structure of the program realizing the authorizer determining process described above. The program is executed when an operator sets a document on image reading unit 44. It is noted that operator authentication takes place before this step and, therefore, the user name of the operator who is to send a facsimile is known to digital multi-functional peripheral 30. Further, it is assumed that in digital multi-functional peripheral 30, whether or not the authorization process by an authorizer is to be done for a facsimile transmission is set in advance by an administrator.

Referring to FIG. 9, the program includes: step S902 of detecting that a document to be transmitted is set by an operator on image reading unit 44; step S904, following step S902, of receiving an input of facsimile transmission information (including destination number and format style) from operation panel 60; step S906, following step S904, of waiting until a start key 80 is pressed; and step S908, executed when start key 80 is pressed, of determining whether digital multi-functional peripheral 30 is set to an operation mode in which a mistransmission preventing function is executed, and branching control flow depending on the result of determination. At step S904, if the format style is unknown, input of format style is unnecessary.

The program further includes: step S910, executed if the result of determination at step S908 is YES (execution of mistransmission preventing function is set), of reading the document to be transmitted set on image reading unit 44; step S911, following step S910, of determining whether or not the format style has been input at step S904, and branching control flow depending on the result of determination; and step S912, executed if the result of determination at step S911 is NO (if the format style has not been input at step S904), of comparing the document image read at step S910 with image characteristic information of every format style registered in format information management table 110, and determining the format of the document image.

The program further includes: step S913 executed, if the result of determination at step S911 is YES (if the format style has been input at step S904), or executed after execution of step S912 if the result of determination at step S911 is NO (if the format style has not been input at step S904), of obtaining condition point and required authorizer information corresponding to an appropriate format style from format information management table 110; step S914, following step S913, of looking up user information management table 90 and obtaining the condition point and required authorizer information corresponding to the user name input at step S904; step S916, following step S914, of looking up transmission destination information management table 100 and obtaining the condition point and required authorizer information corresponding to the destination number input at step S904; and step S918, following step S916, of determining an authorizer from the condition points and required authorizer information obtained at steps S913, S914 and S916. The process at step S918 will be described later with reference to FIG. 10.

At step S912, if the degree of matching between the document image and the image of format style is lower than a prescribed threshold value, the format style is determined to be unregistered, and record information of "format not found" is used.

The program further includes: step S920, following step S918, of issuing a serial number to the facsimile transmission instruction that is being processed, and adding a record to transmission management database 130; and step S922, following step S920, of transmitting an electronic mail requesting authorization to the first authorizer determined at step S918.

Assume that the condition point values obtained at steps S913 to S916 are PA, PB and PC, respectively. At step S920, for the added record, "authorization pending" is input to the cells of the first authorization state and the result of transmission, and if the second and later authorizers are determined, "request unissued" is input to the corresponding cells of authorization state.

At step S922, authorizer information management table 120 is looked up, and an electronic mail requesting authorization (hereinafter referred to as an "authorization request mail") is issued to the mail address of the first authorizer of the record corresponding to the facsimile transmission instruction that is being processed. The authorization request mail includes a URL to be accessed in order to confirm the image to be facsimile-transmitted. The URL includes a host name of a Web server of digital multi-functional peripheral 30, a file name of the image to be transmitted as the object of authorization, and a program name for processing a form related to whether or not the facsimile transmission is to be authorized or refused. Receiving the authorization request mail, the authorizer accesses the URL using the Web browser, receives the image to be facsimile-transmitted from the form processing program, confirms the same, and through the form, returns the message of "authorized" or "refused" to the Web server of digital multi-functional peripheral 30. The Web server passes the message to the facsimile transmission program described above and, thus, facsimile is transmitted, facsimile transmission is refused, or a request for authorization is issued to another authorizer.

The program further includes: step S924, executed if it is determined at step S908 that digital multi-functional peripheral 30 is not set to the operation mode of executing the mistransmission preventing function (NO), of reading the document to be transmitted set at image reading unit 44; and step S926, following step S924, of transmitting the image of document to be transmitted read at step S924, to the destination number input at step S904.

After executing step S922 or step S926, the program ends.

Figure 10:
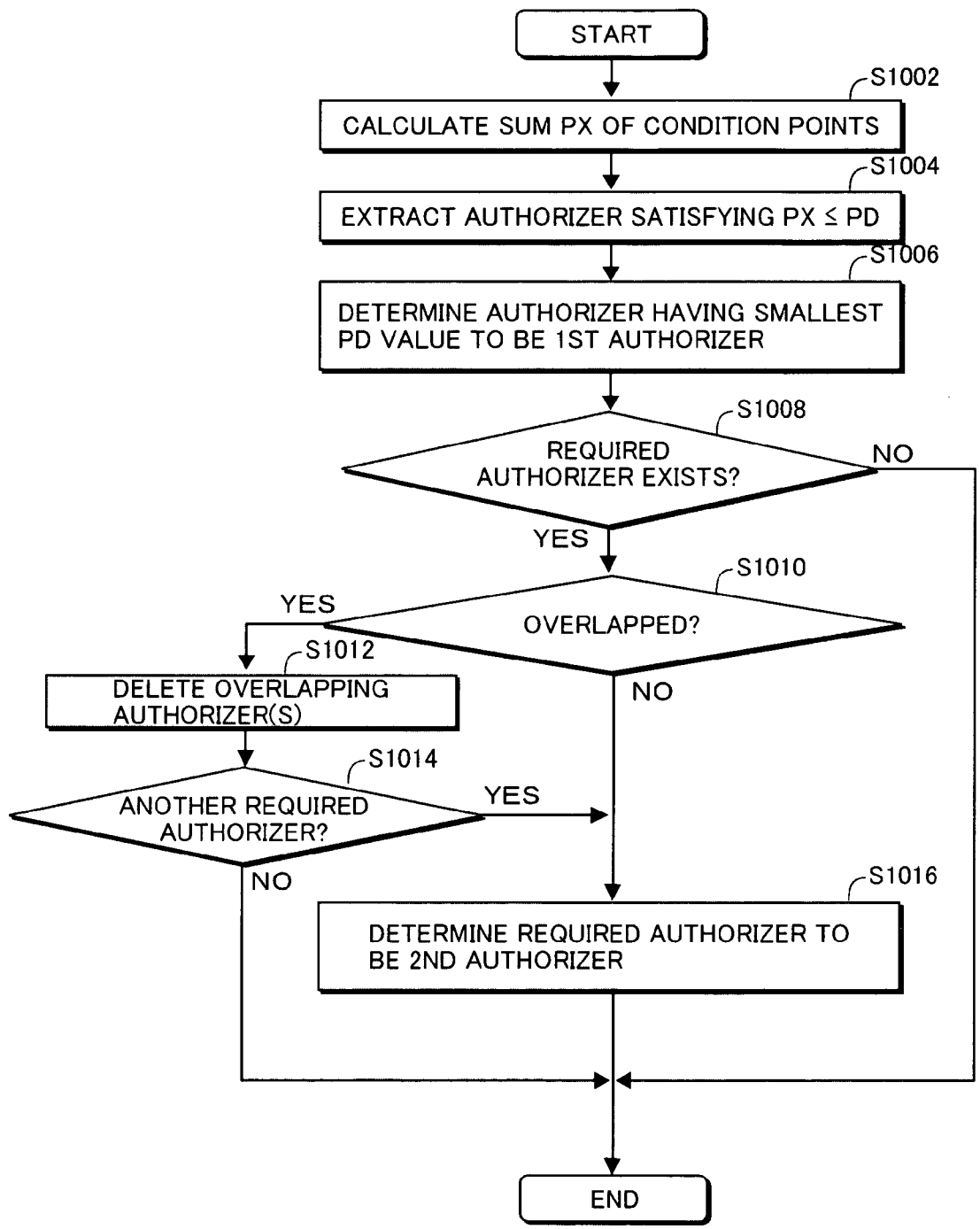
FIG. 10 shows, in the form of a flowchart, a control structure of a routine executed at step S918 of the authorizer determining program shown in FIG. 9.

FIG. 10 shows, in the form of a flowchart, a control structure of the process executed at step S918 shown in FIG. 9. Referring to FIG. 10, the routine includes: a step S1002 of calculating a sum PX of condition point values PA, PB and PC obtained at steps S913 to S916, respectively; step S1004, following step S1002, of extracting all authorizers having a condition point PD satisfying the relation "PX≦PD" on authorizer information management table 120; and step S1006, following step S1004, of determining an authorizer having the smallest condition point as the first authorizer, among the authorizers extracted at step S1004. If a plurality of authorizers having the same condition points are extracted at step S1006, one among these may be determined using, for example, a random number.

The routine further includes: step S1008, following step S1006, of determining whether or not a required authorizer exists, based on the required authorizer information obtained at steps S913 to S916, and branching control flow depending on the result of determination; step S1010, executed if it is determined at step S1008 that a required authorizer exists (YES), of determining whether the required authorizer overlaps the first authorizer, and branching control flow depending on the result of determination; step S1012, executed if it is determined at step S1010 that the authorizers overlap, of deleting one of the overlapping authorizers; step S1014, following step S1012, of determining whether there is any other required authorizer, and branching control flow depending on the result of determination; and step S1016, executed if it is determined at step S1014 that there is another required authorizer, or if it is determined at step S1010 that the authorizers do not overlap, of determining the required authorizer to be the second or later authorizer. If there are a plurality of required authorizers not overlapping with each other at step S1016, the authorizers are determined to be the second, the third and later authorizers starting from one having smaller PD value. If it is determined at step S1008 that there is no required authorizer, or after executing step S1016, the routine ends.

Figure 11:
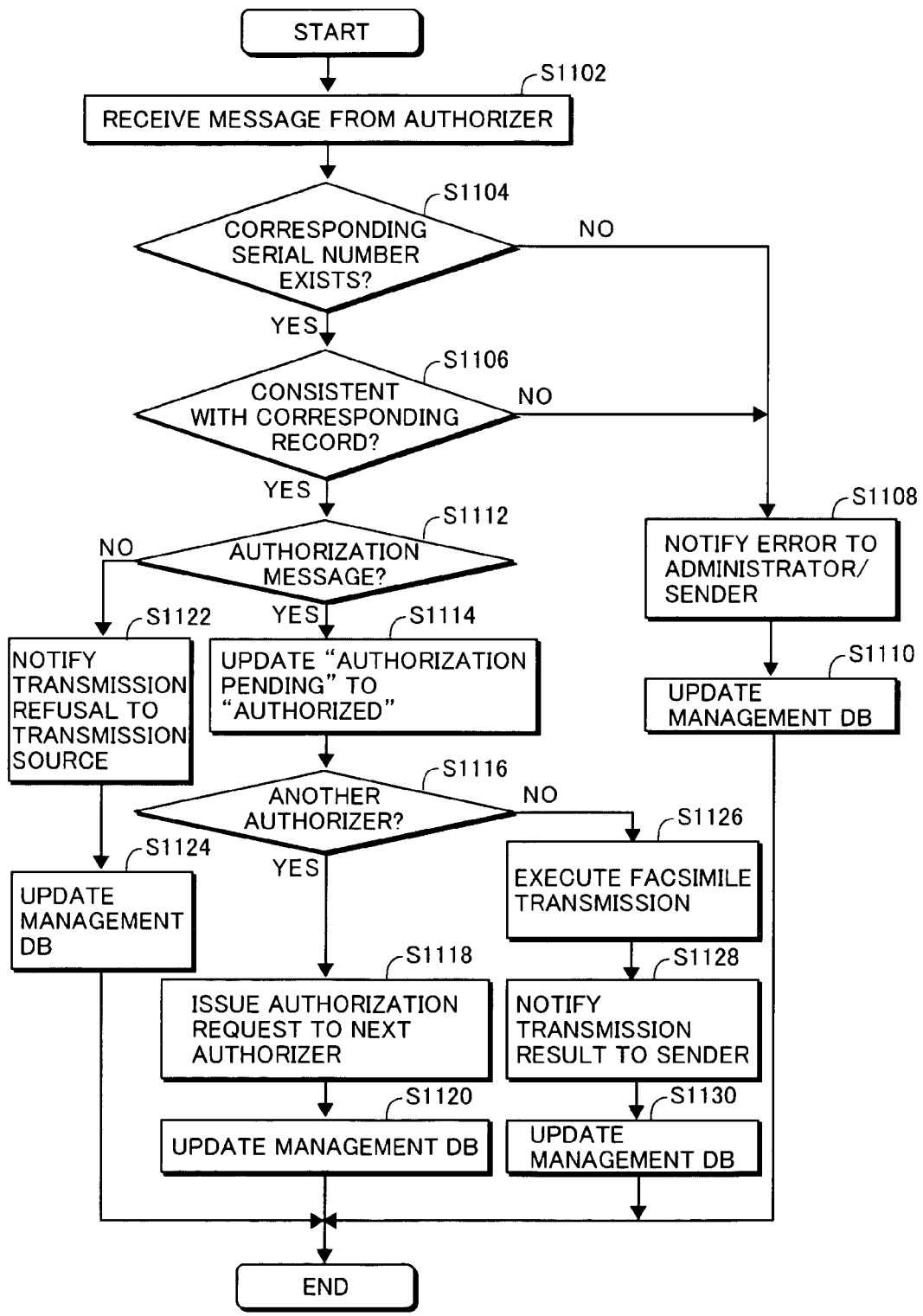
FIG. 11 shows, in the form of a flowchart, a control structure of a facsimile transmission execution program for performing a process for receiving a message from an authorizer, executing or refusing facsimile transmission, or issuing a request for authorization to a next authorizer.

FIG. 11 shows, in the form of a flowchart, a control structure of the facsimile transmission program executed by control unit 42 of digital multi-functional peripheral 30, for realizing a process of receiving a message of authorization process result from the authorizer and executing or refusing facsimile transmission, or a process of issuing a request for authorization to an additional authorizer. The program is activated when the Web server receives a message from an authorizer, using that message as an argument, by a Web server program.

Referring to FIG. 11, the program includes: step S1102 of receiving the message from the authorizer; step S1104, following step S1102, of determining whether or not the serial number included in the message received at step S1102 is registered in transmission management database 130, and branching control flow depending on the result of determination; step S1106, executed if it is determined at step S1104 that the corresponding serial number exists in transmission management database 130, of determining whether or not the contents of the record having the serial number are consistent with the received message, and branching control flow depending on the result of determination; step S1108, executed if the result of determination at step S1104 or S1106 is NO, of issuing an error notification to the administrator and to the user who issued the facsimile transmission instruction; and step S1110 of updating transmission management database 130 as needed. If the corresponding serial number is not found in transmission management database 130, the process of step S1110 is unnecessary. If the corresponding serial number exists in transmission management database 130 and the record contents are not consistent with the received message, information such as "record unacceptable" is input to the cell of transmission result of transmission management database 130.

The determination at step S1106 involves, for example, determination as to whether the message is from an authorizer whose status is "authorization pending" in transmission management database 130, and for a message from an additional authorizer (the second or later authorizer), determination as to whether authorization by any preceding authorizer has been complete or not.

The program further includes: step S1112, executed if it is determined at step S1106 that the received message is consistent with the record of transmission management database 130, of determining whether or not the message indicates authorization of facsimile transmission (authorization message or refusal message), and branching control flow depending on the result of determination; step S1114, executed if it is determined at step S1112 that the message is an authorization message (YES), of updating the cell of authorization state of the corresponding authorizer from "authorization pending" to "authorized" in the corresponding record of transmission management database 130; S1116 of determining, in connection with the facsimile transmission corresponding to the serial number in the received message, whether or not the next authorizer is registered in transmission management database 130, and branching control flow depending on the result of determination; S1118, executed if it is determined at step S1116 that the next authorizer is registered (YES), of issuing an electronic mail requesting authorization to the next authorizer; and step S1120, following step S1118, of updating the state of authorization of the next authorizer to "authorization pending" in the corresponding record of transmission management database 130, and ending the process.

The program further includes: step S1126, executed if it is determined at step S1116 that the next authorizer is not registered (NO), of performing facsimile transmission to the destination number, in accordance with the facsimile transmission instruction; step S1128, following step S1126, of notifying the result of facsimile transmission to the operator as the transmission source; and step S1130, following step S1128, of updating the cell of transmission result of the corresponding record of transmission management database 130 to "transmission complete" or "transmission failed", and ending the process.

The program further includes: step S1122, executed if it is determined at step S1112 that the message is a refusal message (NO), of notifying, by an electronic mail, that the facsimile transmission has been refused to the operator as the transmission source; and step S1124, following step S1122, of updating the first authorization state to "refused" and the cell of transmission result to "transmission refused," of the corresponding record of transmission management database 130 and ending the process.

As regards the message from the authorizer, though simple indication of "authorized" and "refused" are shown in the figure, actually it is preferred to record together the time of reception of the message.

—Operation—

Data communication system 20 in accordance with the present embodiment operates in the following manner.

Assume that user names of all users of digital multi-functional peripheral 30 are registered in advance in user information management table 90. Similarly, condition point and required authorizer are set in advance for each user name, in user information management table 90. Further, assume that all pieces of necessary information are written in advance in transmission destination information management table 100, format information management table 110 and authorizer information management table 120. Database server 32 including these tables is programmed in advance such that if there is a query to the database coming from any of the PCs or multi-functional peripherals in the LAN, necessary information is read from each table and transmitted, provided that the query comes from a qualified person (one with appropriate privilege).

In digital multi-functional peripheral 30, when the document to be transmitted is set on a platen, the program of which control structure is shown in FIG. 9 is activated. Prior to or simultaneously with this, user authentication takes place in digital multi-functional peripheral 30, and user name and password are input.

After successful authentication, the operator inputs user name, format style and transmission destination number through operation panel 60, and presses the start key. Then, determination is made as to whether the mistransmission preventing function is ON or not (step S908). If the mistransmission preventing function is not ON (NO at step S908), the document is read immediately (step S924), facsimile transmission is done (step S926), and program execution ends.

If the mistransmission preventing function is set ON (YES at S908), digital multi-functional peripheral 30 reads the document to be transmitted (step S910), and determination is made as to whether the format style has been input or not (step S911). If the style format is not input, the document read at step S910 is compared with characteristic information of the images of format styles registered beforehand in format information management table 110, and the format style is determined (step S912). At this time, if the degree of matching between the document image and the image of format style determined to have the highest degree of matching is lower than a prescribed threshold value, it is determined that any corresponding format does not exist. In accordance with the format style determined in this manner, the condition point of the corresponding format style and the required authorizer information are obtained from format information management table 110 (step S913). The value of condition point is represented by PA.

Next, digital multi-functional peripheral 30 obtains the condition point and the required authorizer information corresponding to the user name, from user information management table 90 (step S914). The value of this condition point is represented by PB. Digital multi-functional peripheral 30 further obtains the condition point and required authorizer information corresponding to the input destination number, from transmission destination information management table 100 (step S916). The value of this condition point is represented by PC.

Based on the condition points and the pieces of required authorizer information obtained in this manner, digital multi-functional peripheral 30 determines an authorizer related to facsimile transmission in the following manner (step S918). Referring to FIG. 10, the condition point values PA, PB and PC obtained at steps S913 to S916 are summed, to obtain the sum PX (=PA+PB+PC) (step S1102). Next, authorizer information management table 120 is looked up to extract an authorizer or authorizers having the condition point value PD not lower than PX (step S1004). Among the authorizers extracted at step S1004, one having the smallest value of PD is determined to be the first authorizer (step S1006). If there are a plurality of authorizers having the same condition point, one is selected using, for example, a random number.

After determining the first authorizer, determination is made as to whether or not a required authorizer has been found through steps S913 to S916 (step S1008), and if there is none (NO at step S1008), only the first authorizer is determined to be the authorizer and the control exits this routine. If there is any required authorizer (YES at step S1008), whether or not the required authorizer and the first authorizer overlap is determined (step S1010), and if there is an overlap (YES at S1010), the authorizer is deleted (step S1012). If there is not any overlapping authorizer (NO at step S1010), or if there is any required authorizer not overlapping the first authorizer after the overlapping authorizer has been deleted (YES at steps S1014), the required authorizer or authorizers are determined to be the second or later authorizers, and the process ends (step S1016).

Again referring to FIG. 9, after the authorizer is determined at step S918, digital multi-functional peripheral 30 issues a serial number to the facsimile transmission instruction that is being processed, and adds the record of the serial number to the transmission management database (step S920). The record stores the serial number, the date and time when the facsimile transmission instruction was received, transmission destination number, user name of the user who issued the facsimile transmission instruction, the format style name input by the user (or determined at step S912 of FIG. 9), the condition point sum PX calculated at step S1002, and the authorizer information determined by the process of FIG. 10. In the cell of transmission result, a value "not-yet transmitted" is stored.

Thereafter, digital multi-functional peripheral 30 issues an authorization request mail to the authorizer indicated by the cell of first authorizer of this record (step S922), and ends the process. Here, the electronic mail includes a URL description, including file name of the image file, host name of the Web server in digital multi-functional peripheral 30, serial number and a program name for processing the form related to whether or not the facsimile transmission is to be authorized or refused.

Receiving the electronic mail, mail server 33 shown in FIG. 1 distributes the authorization request mail to the mail box of the designated authorizer. Receiving the authorization request mail, the authorizer accesses the URL using a Web browser. The access is processed by Web server 50 in digital multi-functional peripheral 30 in the following manner.

Web server 50 distinguishes the program name of the URL designated by the access from the Web browser, and passes the file name of the image file in the URL as a parameter, to the program that processes an access to the image to be sent by facsimile. The program accesses the facsimile image based on the file name, forms an HTML document allowing input by the authorizer as to whether the facsimile transmission is to be authorized or refused, and transmits the document through Web server 50 to the Web browser in the PC of the authorizer. The Web browser displays the HTML document on the screen. On the screen, the image for facsimile transmission and, by way of example, buttons to be operated to authorize or refuse facsimile transmission are displayed. After confirming the preview image, the authorizer presses the button of "authorize" or "refuse." As a result, a message including information as to which button has been pressed, the authorizer name, and the serial number allocated to the facsimile transmission as the object of authorization is transmitted to digital multi-functional peripheral 30.

Receiving the message from the first authorizer through Web server 50, digital multi-functional peripheral 30 activates the facsimile transmission program. Referring to FIG. 11, the facsimile transmission program receives the message through Web server 50 (step S1102), and determines whether or not the record corresponding to the serial number included in the message exists in transmission management database 130 (step S1104). If there is not, it transmits an error message to the administrator and to the person who requested the facsimile transmission (step S1108), updates transmission management database 130 if necessary (step S1110), and ends the process.

At step S1106, determination is made as to whether the contents of a record corresponding to the serial number included in the message are consistent with the received message. If the two are consistent, control proceeds to step S1112. If not, control proceeds to step S1108, at which error communication is done and transmission management database 130 is updated, and the process ends (steps S1108, S1110).

If it is determined at step S1106 that the received message and the record in transmission management database 130 are consistent, determination is made as to whether the received message is an authorization message (step S1112). If the received message is a refusal message, digital multi-functional peripheral 30 notifies the operator as the transmission source of the transmission refusal (step S1122), updates the contents of transmission management database 130, and ends the process (step S1124). If the received message is an authorization message, digital multi-functional peripheral 30 looks up transmission management database 130 to determine whether or not the next authorizer is registered (step S1116), and if the next authorizer is not registered, facsimile transmission to the destination number is executed (step S1126), result of transmission is notified to the operator as the transmission source (step S1128), transmission management database 130 is updated and the process ends (step S1130). If the next authorizer is registered, an electronic mail requesting authorization is issued to the authorizer (step S1118), transmission management database 130 is updated (step S1120), and the process ends.

If the authorizer is only one (first authorizer), the process shown in FIG. 11 is executed once. If the message of the authorizer is the authorization message, process proceeds through the steps of S1102, S1104, S1106, S1112, S1114, S1116, S1126, S1128, and S1130 in this order, and facsimile transmission takes place. If the message is the refusal message, the process proceeds through the steps of S1102, S1104, S1106, S1112, S1122 and S1124 in this order, facsimile transmission does not take place, and notification of transmission impossible is given to the transmission source.

If there are two authorizers and the first authorizer has transmitted a refusal message, the same process as when there is only one authorizer is executed. If the first authorizer has transmitted an authorization message (steps S1102, 1104, S1106, S1112, S1114), since there is another authorizer, the process steps S1116, S1118 and S1120 are executed thereafter, and the request for authorization is issued to the second authorizer. When a message from the second authorizer is received, the same process as when there is only one authorizer is performed in accordance with the contents, and facsimile transmission is done or facsimile transmission is refused accordingly.

If there are three or more authorizers and transmission has been refused by preceding authorizers, the operation of digital multi-functional peripheral 30 is the same as when there are at most two authorizers. If the first and second authorizers have both transmitted authorization messages, the same process as when there are two authorizers is performed from step S1114, and if there is no further authorizer, facsimile transmission takes place. If there is another authorizer, a request for authorization is issued to the authorizer.

As described above, in facsimile device in accordance with the present embodiment, condition points set for the user information, format information and destination number are summed, and based on the points, the first authorizer is determined. Since the authorizer is selected from the sum of condition points, the authorizer is changed depending on the transmission information of facsimile transmission. Therefore, the authorizers are not fixed to limited persons, and the workload can be alleviated. The condition points are set beforehand by an administrator, to be higher if the necessity of confirming contents of facsimile transmission is greater. Further, among the possible authorizers having the condition points not lower than the sum of condition points, one having the lowest condition points is selected as the authorizer. Therefore, for a facsimile transmission of not very high importance, one having relatively low condition points serves as the authorizer, and as the importance of facsimile transmission increases, one having higher condition point is selected to be the authorizer. Therefore, authorizing task is not concentrated to a limited few.

Further, as a required authorizer can be set in each table, a setting is possible that in a specific case, authorization of a certain authorizer is necessary. By setting a required authorizer, it becomes possible when, for example, any document is to be sent by facsimile to an important customer, to always have the document authorized by a person in charge of transactions with the customer. As a result, error can be prevented and it is clear where responsibility lies.

According to the present embodiment, because of these functions, a facsimile machine having the function of authorization by the authorizer that can alleviate workload on the authorizers by determining the authorizer in consideration of information related to facsimile transmission, can be provided.

In the embodiment described above, condition points and the like are provided in the form of a database outside of digital multi-functional peripheral 30. Such setting allows processing of facsimile transmission requests from a plurality of digital multi-functional peripherals 30 by a single database, attaining the effect of easier database management. The present invention, however, is not limited to such an embodiment. By way of example, such a database may be provided in a digital multi-functional peripheral 30. Further, the information such as condition points mentioned above may be held as a table in the program rather than in the database, or it may be stored as a table in a non-volatile storage and the program may access the table.

Further, in the embodiment described above, facsimile transmission is eventually executed by digital multi-functional peripheral 30. The present invention, however, is not limited to such an embodiment. By way of example, a facsimile transmission request may be sent from digital multi-functional peripheral 30 to a specific facsimile server, and the facsimile server may execute the authorization process by the authorizer described above and then execute the facsimile transmission. Alternatively, the facsimile server may further request another facsimile machine used solely for facsimile transmission, to execute the facsimile transmission.

In the embodiment above, condition points are allocated to the user name, the format style and the destination, and the authorizer is determined by comparing the sum of these condition points with the condition points of possible authorizers. The present invention, however, is not limited to such an embodiment. In addition to these, condition points may be allocated to other conditions such as date and time of transmission, number of sheets to be transmitted and transmission mode, the sum of these points may be calculated, and the calculated result may be compared with the condition points of possible authorizers. Further, not the sum of condition points but multiplication of condition points may be used, or weight may be set to each condition point and the weighted sum of condition points may be used, to determine the authorizer.

In the embodiment described above, a specific authorizer is set as a required authorizer. The present invention, however, is not limited to such an embodiment. By way of example, as the required authorizer, an authorizer may be designated by more generic definition such as "one working in the same section as the user and having longer experience" or "a group of workers of the same section as the user and pre-selected as possible authorizers." In that case, the authorizer may be determined by rotation among the members of the group, or the authorizer may be determined using a random number.

In the embodiment above, the value of condition point of each user in user information management table 90 is set to be higher in accordance with the importance of task assigned to each user. The present invention, however, is not limited to such an embodiment. Contrary to the above, the value of condition point may be set lower in accordance with the importance of task assigned to each user. In that case, the method of determining an authorizer is reverse to the manner of the embodiment above.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An authorizer determining apparatus for determining an authorizer for facsimile transmission, comprising:
   a candidate selecting device for selecting a set of authorizer candidates, based on a combination of attribute values selected in advance for the facsimile transmission; and
   a determining device for determining an authorization candidate satisfying prescribed conditions, from said set of authorizer candidates, wherein:
   each of said attributes may assume one or a plurality of values; and
   said candidate selecting device includes:
      a first condition value storage storing, for each possible value of each of said plurality of attributes, a condition value set in advance,
      a second condition value storage storing, for each of a plurality of possible authorizers, a condition value that is determined in accordance with a privilege of the corresponding possible authorizer,
      a function value calculating device responsive to a request for facsimile transmission, for reading the condition value related to each value of said plurality of attributes of the facsimile transmission related to the request from said first condition value storage, and calculating a prescribed function value corresponding to the condition values, and
      a candidate extracting device for searching, in said second condition value storage, for a possible authorizer having a condition value not smaller than the value calculated by said function value calculating device, and extracting the possible authorizer to be said authorizer candidate.

2. The authorizer determining apparatus according to claim 1, wherein
said prescribed function value is a sum of condition values read from said first condition value storage corresponding to each value of said plurality of attributes.

3. The authorizer determining apparatus according to claim 1, wherein
said function value calculating device allocates, among said plurality of attributes, if there is an attribute of which corresponding condition value is not found in said first condition value storage, a highest condition value to the attribute.

4. The authorizer determining apparatus according to claim 3, wherein
said determining device includes a device for determining an authorizer candidate having the lowest condition value in said set of authorizer candidates to be an authorizer in regard to said request.

5. The authorizer determining apparatus according to claim 4, wherein
said first condition value storage is capable of storing a required authorizer, for every possible value of a first attribute among said plurality of attributes;
said authorizer determining apparatus further comprising
a device responsive to storage of a required authorizer stored in said first condition value storage in association with said first attribute value related to said facsimile transmission as requested, for determining the authorizer to be the authorizer for said facsimile transmission as requested, in addition to the authorizer determined by said determining device.

6. The authorizer determining device according to claim 5, wherein
said plurality of attributes is information for identifying a person who requested the facsimile transmission, information for identifying destination of the facsimile transmission or format of a document to be transmitted by facsimile, or an arbitrary combination of these.

7. An authorizer determining apparatus according to claim 1, wherein
said first condition value storage is capable of storing a required authorizer, for every possible value of a first attribute among said plurality of attributes;
said authorizer determining apparatus further comprising
a device responsive to storage of a required authorizer stored in said first condition value storage in association with said first attribute value related to said facsimile transmission as requested, for determining the authorizer to be the authorizer for said facsimile transmission as requested, in addition to the authorizer determined by said determining device.

8. A non-transitory computer readable recording medium, storing a computer program causing, when executed by a computer, the computer to operate as an authorizer determining apparatus for determining an authorizer for a facsimile transmission, wherein
said authorizer determining apparatus includes
a candidate selecting device for selecting a set of authorizer candidates, based on a combination of a plurality of attributes values selected in advance for the facsimile transmission, and
a determining device for determining an authorizer candidate satisfying prescribed conditions, from said set of authorizer candidates, and
wherein:
each of said attributes may assume one or a plurality of values; and
said candidate selecting device includes:
a first condition value storage storing, for each possible value of each of said plurality of attributes, a condition value set in advance,
a second condition value storage storing, for each of a plurality of possible authorizers, a condition value that is determined in accordance with a privilege of the corresponding possible authorizer,
a function value calculating device responsive to a request for facsimile transmission, for reading the condition value related to each value of said plurality of attributes of the facsimile transmission related to the request from said first condition value storage, and calculating a prescribed function value corresponding to the condition values, and
a candidate extracting device for searching, in said second condition value storage, for a possible authorizer having a condition value not smaller than the value calculated by said function value calculating device, and extracting the possible authorizer to be said authorizer candidate.

9. A facsimile machine comprising:
an authorizer determining apparatus for determining, upon reception of a facsimile transmission request, an authorizer for the facsimile transmission;
an authorization requesting device for issuing a request for authorizing said facsimile transmission to the authorizer determined by the authorizer determining apparatus; and
a facsimile transmission executing device for executing the facsimile transmission authorized by the authorizer in accordance with attributes of said facsimile transmission, among facsimile transmissions for which authorization has been requested by said authorization requesting device; wherein
said authorizer determining apparatus is for determining an authorizer for said facsimile transmission, including
a candidate selecting device for selecting a set of authorizer candidates, based on a combination of a plurality of attributes values selected in advance for the facsimile transmission, and
a determining device for determining an authorizer candidate satisfying prescribed conditions, from said authorizer candidates,
wherein
each of said attributes may assume one or a plurality of values; and
said candidate selecting device includes:
a first condition value storage storing, for each possible value of each of said plurality of attributes, a condition value set in advance,
a second condition values storage storing, for each of a plurality of possible authorizers, a condition value that is determined in accordance with a privilege of the corresponding possible authorizer,
a function value calculating device responsive to a request for facsimile transmission, for reading the condition value related to each value of said plurality of attributes of the facsimile transmission related to the request from said first condition value storage, and calculating a prescribed function value corresponding to the condition values, and
a candidate extracting device for searching, in said second condition value storage, for a possible authorizer having a condition value not smaller than the value calculated by said function value calculating device, and extracting the possible authorizer to be said authorizer candidate.

10. The facsimile machine according to claim 9, wherein the function value is a sum of condition values read from said first condition value storage corresponding to each value of said plurality of attributes.

11. The facsimile machine according to claim 10, wherein said function value calculating device allocates, among said plurality of attributes, if there is an attribute of which corresponding condition value is not found in said first condition value storage, a highest condition value to the attribute.

12. The facsimile machine according to claim 10, wherein said determining device includes a device for determining an authorizer candidate having the lowest condition value in said set of authorizer candidates to be the authorizer in regard to said request.

13. The facsimile machine according to claim 12, wherein said first condition value storage is capable of storing a required authorizer, for every possible value of a first attribute among said plurality of attributes;
said authorizer determining apparatus further comprising
a device responsive to storage of a required authorizer stored in said first condition value storage in association with said first attribute value related to said facsimile transmission as requested, for determining the authorizer to be the authorizer for said facsimile transmission as requested, in addition to the authorizer determined by said determining device.

14. The facsimile machine according to claim 13, wherein said plurality of attributes is information for identifying a person who requested the facsimile transmission, information for identifying destination of the facsimile transmission or format of a document to be transmitted by facsimile, or an arbitrary combination of these.

15. The facsimile machine according to claim 9, wherein said first condition value storage is capable of storing a required authorizer, for every possible value of a first attribute among said plurality of attributes;
said authorizer determining apparatus further comprising
a device responsive to storage of a required authorizer stored in said first condition value storage in association with said first attribute value related to said facsimile transmission as requested, for determining the authorizer to be the authorizer for said facsimile transmission as requested, in addition to the authorizer determined by said determining device.

* * * * *